(12) United States Patent
Mäkelä et al.

(10) Patent No.: US 12,378,477 B2
(45) Date of Patent: Aug. 5, 2025

(54) METHOD FOR PRODUCING RENEWABLE AVIATION FUEL

(71) Applicant: NESTE OYJ, Espoo (FI)

(72) Inventors: Eveliina Mäkelä, Porvoo (FI); Sylvia Albersberger, Porvoo (FI); Marja Tiitta, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/723,667

(22) PCT Filed: Nov. 21, 2022

(86) PCT No.: PCT/FI2022/050768
§ 371 (c)(1),
(2) Date: Jun. 24, 2024

(87) PCT Pub. No.: WO2023/126564
PCT Pub. Date: Jul. 6, 2023

(65) Prior Publication Data
US 2025/0066676 A1    Feb. 27, 2025

(30) Foreign Application Priority Data
Dec. 27, 2021  (FI) ...................................... 20216358

(51) Int. Cl.
| C10G 45/64 | (2006.01) |
| B01J 29/74 | (2006.01) |
| B01J 35/64 | (2024.01) |
| C10G 3/00 | (2006.01) |

(52) U.S. Cl.
CPC ................ *C10G 3/44* (2013.01); *B01J 29/74* (2013.01); *B01J 35/64* (2024.01); *C10G 3/50* (2013.01); *C10G 45/64* (2013.01); *C10G 2300/1011* (2013.01); *C10G 2300/201* (2013.01); *C10G 2400/08* (2013.01)

(58) Field of Classification Search
CPC . C10G 3/44; C10G 3/50; C10G 45/64; C10G 2300/1011; C10G 2300/201; C10G 2400/08
See application file for complete search history.

(56) References Cited

U.S. PATENT DOCUMENTS

| 8,546,626 | B2 * | 10/2013 | Daudin .................... B01J 29/74 |
| | | | 585/242 |
| 2008/0035525 | A1 * | 2/2008 | Burgfels .............. B01J 29/7034 |
| | | | 208/143 |
| 2009/0270245 | A1 | 10/2009 | Kumar et al. |
| 2009/0283442 | A1 | 11/2009 | Mccall et al. |
| 2009/0287029 | A1 * | 11/2009 | Anumakonda ........ C10G 45/64 |
| | | | 585/16 |
| 2010/0298616 | A1 * | 11/2010 | Kettunen .................. C07C 9/22 |
| | | | 585/277 |
| 2011/0015459 | A1 | 1/2011 | Aalto et al. |
| 2012/0022305 | A1 | 1/2012 | Yao et al. |
| 2013/0310620 | A1 | 11/2013 | Kalnes |
| 2014/0115952 | A1 | 5/2014 | Wang |
| 2014/0274664 | A1 | 9/2014 | Weigel et al. |
| 2014/0275689 | A1 | 9/2014 | Petrovic et al. |
| 2014/0335586 | A1 | 11/2014 | Zhang |
| 2015/0203417 | A1 | 7/2015 | Tian et al. |
| 2019/0136142 | A1 | 5/2019 | Chang et al. |
| 2021/0087480 | A1 * | 3/2021 | Abhari .................... C10G 65/12 |
| 2021/0198584 | A1 | 7/2021 | Vermeiren |
| 2021/0207041 | A1 | 7/2021 | Vermeiren |
| 2021/0269722 | A1 * | 9/2021 | Touronen ................. C10G 3/50 |
| 2023/0357648 | A1 | 11/2023 | Slade |
| 2023/0407191 | A1 | 12/2023 | Xu |

FOREIGN PATENT DOCUMENTS

| CN | 109336130 A | 2/2019 |
| EP | 1741768 A1 | 1/2007 |
| EP | 2325281 A1 | 5/2011 |
| EP | 2253608 B2 | 6/2021 |
| EP | 1830956 B1 | 11/2022 |
| WO | 2006070073 A1 | 7/2006 |
| WO | WO 2009130392 A1 | 10/2009 |
| WO | 2009151692 A2 | 12/2009 |
| WO | WO 2009144411 A2 | 12/2009 |
| WO | 2015181744 A1 | 12/2015 |
| WO | 2020016405 A1 | 1/2020 |
| WO | 2020016410 A1 | 1/2020 |
| WO | WO 2021119610 A1 | 6/2021 |

OTHER PUBLICATIONS

International Search Report for PCT/FI2022/050768, mailed Feb. 17, 2023, 3 pages.
Written Opinion of the ISA for PCT/FI2022/050768 mailed Feb. 17, 2023, 5 pages.
International Preliminary Report on Patentability for PCT/FI2022/050766, dated Apr. 5, 2024, 8 pages.
Finnish Search Report for FI 20216358, dated Mar. 14, 2022, 2 pages.
Parmar S. et al., "Hydroisomerization of n-hexadecane over Brønsted acid site tailored Pt/ZSM-12", Journal of Porous Materials Springer, US, New York, vol. 21, Aug. 9, 2014, 9 pages.
Ivo J Dijs et al., "Quantitative Determination by 14C Analysis of the Biological Component in Fuels", Radiocarbon, vol. 48, Nr 3, 2006, 9 pages.

(Continued)

*Primary Examiner* — Randy Boyer

(74) *Attorney, Agent, or Firm* — Joshua B. Brady; Nixon & Vanderhye, P.C.

(57) ABSTRACT

The present invention relates to a method for producing renewable aviation fuel D or components thereto from a feed-stock A of biological origin, in particular to methods comprising separate hydrodeoxygenation 20 and hydroisomerization 40 steps wherein the hydroisomerization is performed in the presence of a catalyst comprising a noble metal, a 12-membered ring zeolite with a pore size below 0.7 nm.

17 Claims, 1 Drawing Sheet

(56) References Cited

OTHER PUBLICATIONS

International Search Report for PCT/FI2022/050765, mailed Feb. 8, 2023, 3 pages.
Written Opinion for PCT/FI2022/050765, mailed Feb. 8, 2023, 5 pages.
International Preliminary Report on Patentability w/Annex for PCT/FI2022/050765, dated Feb. 7, 2024, 38 pages.
Finnish Search Report for FI 20216355, dated Mar. 11, 2022, 2 pages.
Feng Cheng et al., "Producing jet fuel from biomass lignin: Potential pathways to alkyl-benzenes and cycloalkanes", Renewable and Sustainable Energy Reviews, vol. 72, Jan. 21, 2017, pp. 673-722.
Machine Translation of WO-2009144411-A2 (Year: 2009).
International Search Report for PCT/FI2022/050767, mailed Feb. 13, 2023, 3 pages.
Written Opinion of the ISA for PCT/FI2022/050767 mailed Feb. 13, 2023, 5 pages.
International Preliminary Report on Patentability for PCT/FI2022/050767 mailed Apr. 17, 2024, 12 pages.
Finnish Search Report for FI 20216357, dated Mar. 25, 2022, 2 pages.
Kloetstra K. R. et al., "Overgrowth of Mesoporous MCM-41 on Faujasite", Microporous Materials, Elsevier Science BV, Amsterdam, NL, vol. 6, No. 5/06, 1996, pp. 287-293.
International Search Report for PCT/FI2022/050769, mailed Feb. 20, 2023, 3 pages.
Written Opinion of the ISA for PCT/FI2022/050769, mailed Feb. 20, 2023, 3 pages.
Jia et al., "Modern synthesis strategies for hierarchical zeolites: Bottom-up versus top-down strategies", Advanced Powder Technology 30 (2019) pp. 467-484.
Gao et al., "Hydrocracking diversity in n-dodecane isomerization on Pt/ ZSM-22 and Pt/ZSM-23 catalysts and their catalytic performance for hydrodewaxing of lube base oil", Petroleum Science, 2020 (doi: 10.1007/s12182-020-00500-7), 12 pages.
Zhai M, Li L, Ba Y, Zhu K, Zhou X, Fabricating ZSM-23 with Reduced Aspect Ratio Through Ball-Milling and Recrystallization: Synthesis, Structure and Catalytic Performance in N-heptane Hydroisomerization, Catalysis Today 329 (2019) pp. 82-93.
Technical Data Sheet: ACS Material ZSM-23. [online], Nov. 9, 2018, [retrieved Mar. 10, 2022] from https://www.acsmaterical.com/zsm-23.html , whole document.
Search Report for FI20216359, dated Mar. 23, 2022, 2 pages.
International Preliminary Report on Patentability for PCT/FI2022/050769, completed Apr. 2, 2024, 10 pages.

\* cited by examiner

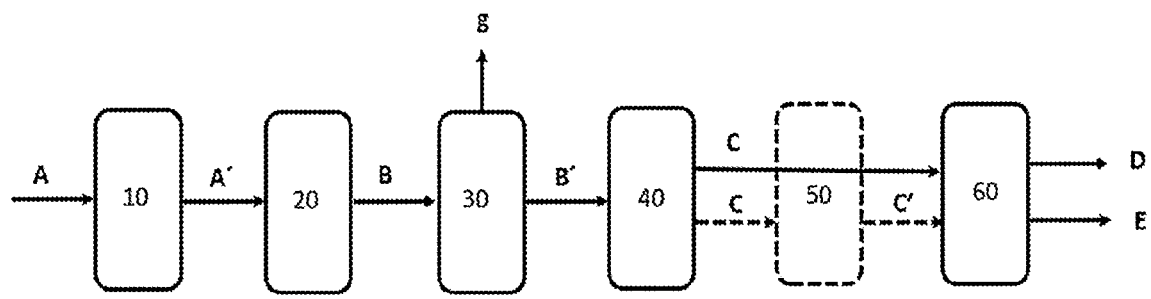

METHOD FOR PRODUCING RENEWABLE AVIATION FUEL

CROSS-REFERENCE TO RELATED APPLICATIONS

This application is the U.S. national phase of International Application No. PCT/FI2022/050768 filed Nov. 21, 2022 which designated the U.S. and claims priority to FI 20216358 filed Dec. 27, 2021, the entire contents of each of which are hereby incorporated by reference.

FIELD

The present disclosure relates to a method for producing renewable aviation fuel or components thereto from feedstock of biological origin, in particular to methods comprising separate hydrodeoxygenation and hydroisomerization steps wherein the hydroisomerization is performed in the presence of a catalyst comprising a noble metal, a zeolite and a support, wherein the zeolite is a 12-membered ring zeolite with a pore size below 0.7 nm.

BACKGROUND

Aviation has been reported to account for 2.4% of the global $CO_2$ emissions in 2019 with an increase to about 4.3% by 2050. Several countries have introduced mandates to blend sustainable aviation fuel (SAF) with fossil jet fuel. For example, Finland has proposed to aim for up to 30% blends by 2030.

Sustainable aviation fuel demand is expected to grow in the future due to global initiatives to decrease emissions of greenhouse gases. One possibility to decrease greenhouse gas emissions is to increase the use of renewable fuels in preparation of aviation fuels. Renewable aviation fuel derived from biomass, such as plants, trees, algae, waste, and other organic matter bio-oils, offers an opportunity to reduce these emissions.

There are different types of aviation fuels which are strictly specified in various standards. Aircraft and engine fuel system components and fuel control units rely on the fuel to lubricate their moving parts. For example, lubricity of aviation kerosene type fuel produced by hydroprocessing is limited by the DEF STAN 91-091 standard to a maximum wear scar diameter of 0.85 mm as measured with an ASTM D5001 test method called BOCLE (ball on cylinder lubricity evaluator). The requirement to measure lubricity is applied whenever synthesised fuel components are used in a final fuel blend. Fuel lubricity is particularly important in military use.

The hydrocarbon isomer distribution in petrochemicals contributes to many important petrochemical characteristics such as boiling and melting points, octane number, combustion efficiency, flash point, viscosity, lubricity, solubility, and solvation power. These characteristics are strongly influenced by hydrocarbon chain branching. This is especially important for jet engine fuels. If these are not to specification, jet fuel lines can freeze up or engines malfunction.

SAPO-11 based isomerization catalysts are excellent in catalysing selective hydroisomerization reactions to produce selectively isomers with the same carbon numbers. In the production of aviation fuel components, the hydrocarbons with carbon numbers from C9 to C16 are particularly desired. Since the medium acid strength of SAPO-11, a limited amount of lighter hydrocarbons compared to the hydrocarbons obtained from HDO as products are formed in the isomerization unit. The reaction temperature of an isomerization unit can be increased to enhance hydrocracking with SAPO-11 based isomerization catalyst to produce hydrocarbons with lower carbon numbers, but this will eventually limit the lifetime of the catalyst in the isomerization unit. SAPO-11 as a molecular sieve is also expensive in comparison to several other zeolite type materials. Moreover, SAPO-11 has limited stability for the moisture and different precautions need to be taken into account e.g. in loading of commercial processing units.

The typically used current isomerization catalysts, such as Pt/SAPO-11/$Al_2O_3$ type catalysts disclosed in EP1741768, are developed to produce a maximum amount of renewable diesel fuel component with excellent diesel fuel properties. For the renewable aviation fuel production, the catalysts need to be optimised towards the yield and specifications of aviation fuel, or components thereof. The carbon number distribution needs to be tuned to e.g. range from C5 to C16, being different compared to diesel fuel components. The excellent cold properties of aviation fuel are one crucial factor which can be addressed by extending branching of the hydrocarbons in the renewable aviation fuel components.

Parmar et al (J. Porous Mater., 2014, 21:849-857) disclose hydroisomerization of n-hexadecane over Brønsted acid site tailored Pt/ZSM-12.

Accordingly, there is still a need for further methods for producing renewable aviation fuel.

SUMMARY

The present invention is based on the observation that when a feedstock of biological origin, meaning a renewable feedstock, is hydrodeoxygenated followed by hydroisomerization using a particular zeolite-based catalyst as the hydroisomerization catalyst at sufficiently moderate temperature, the quality of the aviation fuel may be improved due to enhanced branching.

Accordingly, it is an object of the present invention to provide a method for producing renewable aviation fuel, or components thereto, from a renewable feedstock, the method comprising:
a) providing a renewable feedstock,
b) pre-treating the renewable feedstock by reducing the amount of impurities therein not to include: more than 10 w-ppm alkali metal and alkaline earth metal impurities, calculated as elemental alkali metals and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon; to produce a pre-treated feedstock,
c) subjecting the pre-treated feedstock to hydrodeoxygenation reaction to produce a hydrodeoxygenated stream, wherein the hydrodeoxygenation reaction comprise one or more of:
   a. a temperature in the range from 250° C. to 400° C.,
   b. a pressure in the range from 10 bar to 200 bar,
   c. a WHSV in the range from 0.25 $h^{-1}$ to 3 $h^{-1}$,
   d. a $H_2$ flow from 350 to 1500 N-L $H_2$/L feed, and
   e. a hydrodeoxygenation catalyst selected from Pd, Pt, Ni, Co, Mo, Ru, Rh, and W or any combination thereof, on a support
   to produce hydrodeoxygenated stream,
d) subjecting the hydrodeoxygenated stream to a gas-liquid separation, thereby producing a gaseous stream and a hydrodeoxygenated liquid stream, e) subjecting the hydrodeoxygenated liquid stream to hydroisomerization reaction in a presence of a hydroisomerisation catalyst, comprising a noble metal, a 12-member ring zeolite with pore size below 0.7 nm and acidity from 180 µmol/g to 500 µmol/g measured with $NH_3$-TPD method wherein acidity is calculated from the amount of $NH_3$ adsorbed at 200° C. and desorbed between 100° C. and 500° C., on a support, and hydrogen in a pressure in the range from 30 bar to 40 bar, at a temperature in a range from 270° C. to 310° C. to produce a hydroisomerized stream, f) optionally subjecting the hydroisomerized stream to stabilization, to obtain a stabilized hydroisomerized stream, and g) separating from the hydroisomerized stream, or from the stabilized hydroisomerized stream, the renewable aviation fuel, or components thereto wherein the renewable aviation fuel or components thereto comprises C5-C9 hydrocarbons suitable for aviation gasoline or components thereto and C10-C16 hydrocarbons suitable for jet fuel or components thereto.

It is also an object of the present invention to provide a use of a catalyst comprising a noble metal, a 12-member ring zeolite with pore size below 0.7 nm on a support for producing renewable aviation fuel from a renewable paraffinic feed by hydroisomerization at a temperature in a range from 270° C. to 310° C. in presence of hydrogen flow.

A number of exemplifying and non-limiting embodiments of the invention are described in accompanied dependent claims.

The standards discussed are the latest revisions unless otherwise indicated.

Various exemplifying and non-limiting embodiments of the invention together with additional objects and advantages thereof, will be best understood from the following description of specific exemplifying and non-limiting embodiments when read in connection with the accompanying figures.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e., a singular form, throughout this document does not exclude a plurality.

BRIEF DESCRIPTION OF DRAWING

FIG. 1 shows an exemplary non-limiting schematic overview of simultaneous production of renewable gases, renewable naphtha, and renewable aviation fuel according to an embodiment of the method of the present invention.

DESCRIPTION

FIG. 1 shows an exemplary process of the present invention for production of renewable gases, renewable naphtha, and renewable aviation fuel. In the figure reference numbers and arrows illustrate reactions and streams, respectively.

According to one embodiment method comprises the following steps:

a) providing a renewable feedstock A, b) pre-treating 10 the feedstock to produce a pre-treated feedstock A' c) subjecting the pre-treated feedstock to hydrodeoxygenation 20 reaction to produce hydrodeoxygenated stream B, d) subjecting the hydrodeoxygenated stream to a gas-liquid separation 30 to produce gaseous stream g and hydrodeoxygenated liquid stream B', e) subjecting the hydrodeoxygenated liquid stream to hydroisomerization 40 reaction to produce a hydroisomerized stream C, and f) optionally, subjecting the hydroisomerized stream to stabilization 50 to produce stabilized hydroisomerized stream C', and g) separating 60 from the hydroisomerized stream or from the optional stabilized hydroisomerized stream, at least the renewable aviation fuel D or components thereto, and optionally also renewable C1-C4 hydrocarbons E.

A process for preparing renewable hydrocarbons suitable for use as aviation fuel, such as renewable aviation fuel or sustainable aviation fuel, from an oxygenated i.e. oxygen containing renewable feedstock is disclosed.

By aviation fuel suitable for conventional jet turbine engines is meant a hydrocarbon blend or a component thereto suitable for use as aviation fuel fulfilling the requirements of ASTM D7566.

By renewable aviation fuel suitable for use in conventional jet turbine engines is meant aviation fuel or components thereto which have been manufactured from renewable feedstock. By sustainable aviation fuel (SAF) is herein meant renewable aviation fuel which is produced sustainably and is able to reduce GHG emissions, preferably at least 70%, such as about 80%, compared to fossil jet fuel baseline, and helps the aviation industry to meet the ambitious $CO_2$ reduction targets for the future.

The renewable aviation fuel may be a blend or a component thereto suitable for use in SAF blends according to ASTM D7566 (2021) Annex A2 (HEFA SPK).

In the present disclosure sustainable aviation fuel further comprises, in addition to SAF suitable for jet fuel, also SAF suitable for use as aviation gasoline (the same as avgas) that is used in different types of engines, namely, in aircraft spark ignition reciprocating engines. Avgas is gasoline type aviation fuel fulfilling the requirements of Defence Standard 91-090 (2019).

Strongly branched hydrocarbons, iso-paraffins (the same as i-paraffins), decrease the freezing point in blends which is a desired feature in fuels.

The Feedstock

Examples of oxygenated hydrocarbon feedstocks are fatty acids and triglycerides, which are present in large amounts in e.g. plant oils and animal fats. An oxygenated hydrocarbon feedstock of renewable origin, such as plant oils and animal fats, is well suited for the process. The majority of these plant oils and animal fats are typically composed of fatty acids, either as free fatty acids or as esters of free fatty acids, such as fatty acids of 25 wt-% or 40 wt-% or more. Examples of esters of free fatty acids are fatty acid glyceride esters (mono-, di- and/or tri-glyceridic) or for example the fatty acid methyl esters (FAME) or fatty acid ethyl esters (FAE). Accordingly, the oxygenated hydrocarbon feedstocks of renewable origin may contain 25 wt-% or more of fatty acids or fatty acid esters.

The renewable character of carbon-containing compositions, such as feedstocks and products of biological origin i.e. renewable feedstock and products, can be determined by comparing the $^{14}$C-isotope content of the feedstock to the $^{14}$C-isotope content in the air in 1950. The $^{14}$C-isotope content can be used as evidence of the renewable origin of the feedstock or product. Carbon atoms of renewable material comprise a higher number of unstable radiocarbon ($^{14}$C) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify renewable carbon compounds and differentiate those from non-renewable i.e. fossil carbon compounds. The isotope ratio does not change in the course of chemical reactions. Examples of a suitable method for analysing the content of carbon from biological sources is ASTM D6866 (2020).

An example of how to apply ASTM D6866 to determine the renewable content in fuels is provided in the article of Dijs et al., Radiocarbon, 48 (3), 2006, pp 315-323. For the purpose of the present invention, a carbon-containing material, such as a feedstock or product is considered to be of renewable origin if it contains 90% or more modern carbon, such as 100% modern carbon, as measured using ASTM D6866.

The feedstock may include plant oils and/or vegetable oils and/or microbial oils like babassu oil, palm seed oil, carinata oil, olive oil, coconut butter, soybean oil, canola oil, coconut oil, muscat butter oil, rapeseed oil, peanut oil, sesame oil, maize oil, sunflower oil, poppy seed oil, cottonseed oil, soy oil, laurel seed oil, crude tall oil, tall oil, tall oil fatty acid, tall oil pitch, crude palm oil, palm oil, palm oil fatty acid distillate, jatropha oil, palm kernel oil, camelina oil, archaeal oil, bacterial oil, fungal oil, protozoal oil, algal-based oils, muscat butter oil, seaweed oil, mustard seed oil, oils from halophiles, lauric-myristic acid group (C12-C14) including milk fats, palmitic acid group (C16) including earth animal fats, stearic acid group (C18) including earth animal fats, linoleic acid group (unsaturated C18) including whale and fish oils, erucic acid group (unsaturated C22) including whale and fish oils, oleo stearic acid group (conjugated unsaturated C18) including whale and fish oils, fats with substituted fatty acids (ricin oleic acid, C18) such as castor oil, and mixtures of any two or more thereof.

The oils of the feedstock may be classified as crude, degummed, heat treated and RBD (refined, bleached, and deodorised) grade, depending on the level of pre-treatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease (FOG) from municipalities such as water treatment facilities, and spent oils from industrial packaged food operations, and mixtures of any two or more thereof.

The feedstock may include derivatives of natural fats include mono- or diglycerides of C10-C28 fatty acids, C10-C28 fatty acids, C10-C28 fatty acid anhydrides, non-glyceride C10-C28 fatty acid esters, C10-C28 fatty alcohols, C10-C28 fatty aldehydes and C10-C28 fatty ketones. The C10-C28 fatty acids, their mono- and diglycerides, as well as their anhydrides are typically prepared by hydrolysis of the corresponding triglyceride. The non-glyceride C10-C28 fatty acid esters are mainly prepared from the triglycerides by transesterification. The C10-C28 fatty alcohols, aldehydes and ketones are prepared by reduction, usually by hydrogenation, of the corresponding fatty acids. Advantageously, the feedstock hydrocarbons may be of C10-C24.

The derivatives of natural fats also include any of the aforementioned natural fats and derivatives, the hydrocarbon chain of which has been modified e.g. by substitution, branching or saturation.

According to a particular embodiment the feedstock is selected from waste and residues from animal fat or oil, plant fat or oil, and fish fat or oil, and mixtures thereof.

An exemplary feedstock comprises at least triglycerides. Most typical exemplary feedstocks are animal fats and palm oil fatty acid, especially those originating from waste and residues.

A further exemplary feedstock comprises at least fatty acids. Most typical feedstock are various plant oils, and e.g. tall oil materials, such as crude tall oil.

The natural fats or derivatives thereof may be provided in pure form or as part of a feedstock containing other components. Preferably, the feedstock contains at least 20 wt-%, more preferably at least 30 wt-%, most preferably at least 40 wt-% of pure natural fat or natural oil or their derivatives.

According to one embodiment the renewable feedstock may be selected from suitable feedstocks listed in Annex IX, Part A and Annex IX, Part B of the Renewable Energy Directive (EU) 2018/2001 (REDII), and mixtures thereof. It comprises the following materials provided that the specified criteria required are met:
  (a) Algae;
  (b) Biomass fraction of mixed municipal waste;
  (c) Biowaste;
  (d) Biomass fraction of industrial waste not fit for use in the food or feed chain;
  (e) Straw;
  (f) Animal manure and sewage sludge;
  (g) Palm oil mill effluent and empty palm fruit bunches;
  (h) Tall oil pitch;
  (i) Crude glycerine;
  (j) Bagasse;
  (k) Grape marks and wine lees;
  (l) Nut shells;
  (m) Husks;
  (n) Cobs cleaned of kernels of corn;
  (o) Biomass fraction of wastes and residues from forestry and forest-based industries, namely, bark, branches, pre-commercial thinnings, leaves, needles, treetops, saw dust, cutter shavings, black liquor, brown liquor, fibre sludge, lignin, and tall oil;
  (p) Other non-food cellulosic material;
  (q) Other ligno-cellulosic material except saw logs and veneer logs:
  (r) Used cooking oil;
  (s) Animal fats.

Wastes are defined in the REDII and waste framework directive (2008/98/EC) as "any substance or object which the holder discards or intends or is required to discard". Based on this definition, examples of wastes in Annex IX include used cooking oil, UCO (when not used for other uses), oils from the industrial and municipal wastes and oils from sewage sludge.

Residues are defined in the REDII as "a substance that is not the end product(s) that a production process directly seeks to produce; it is not a primary aim of the production process, and the process has not been deliberately modified to produce it".

In one embodiment, the renewable feedstock is selected from suitable feedstocks, preferably wastes and residues, listed in Annex IX, Part A or Annex IX, Part B of the Renewable Energy Directive (EU) 2018/2001, and mixtures thereof.

An exemplary renewable feedstock preferably includes waste and residue materials originating from animal fat/oil, plant fat/oil or fish fat/oil. These may comprise sludge palm oil, such as palm effluent sludge (PES) or palm oil mill effluent (POME), used cooking oil (UCO), acid oils (ASK), brown grease (BG), sludge palm oil, spent bleaching earth oil (SBEO), technical corn oil (TCO) or lignocellulosic based oils, municipal solid waste-based oils, or algae-based oils. Most preferably, the feeds include UCO, sludge palm oil, TCO and algae-based oils.

Pre-treatment

Typically, the waste and residue materials contain a wide variety of heteroatomic compounds, which often are more difficult to remove by conventional feedstock pre-treatments typically used for pre-treatment of matrices comprising triacylglycerols. The waste and residue materials may comprise accumulated alkali and alkaline earth metals, such as sodium, potassium, calcium, magnesium; other metals such as iron or copper; nitrogen containing compounds, such as amines and amides; phosphorus containing compounds, such as phospholipids; silicon containing compounds, such as siloxanes and polydimethylsiloxanes (PDMS); halides, sulphur containing compounds, etc. depending on the type of residue/waste. These materials are typically harmful for the catalyst used in hydrotreatment and isomerization and need to be decreased or removed before entering the feedstock onto the catalysts.

Depending on the level of pre-treatment, fats, oils, and greases may contain high amounts of impurity materials e.g., about 1-1000 w-ppm (ppm by weight) phosphorus; and about 1-500 w-ppm total metals, mainly sodium, potassium, magnesium, calcium, iron, and copper. Nor is it uncommon that animal fat can contain e.g., 1000 w-ppm or even higher nitrogen measured as elemental nitrogen.

The feedstock of the present method needs to be suitable for hydrodeoxygenation. Typically, the feedstock entering into a hydrodeoxygenation reactor or a catalyst bed thereof should not include more than 10 w-ppm, preferably not more than 5 w-ppm, more preferably not more than 1 w-ppm alkali metal and alkaline earth metal impurities, calculated as elemental alkaline and alkaline earth metals; not more than 10 w-ppm, preferably not more than 5 w-ppm, more preferably not more than 1 w-ppm other metals, calculated as elemental metals; not more than 1000 w-ppm, preferably not more than 500 w-ppm, more preferably not more than 150 w-ppm, most preferably not more than 50 w-ppm, such as not more than 5 w-ppm, such as not more than 1 w-ppm nitrogen containing impurities, calculated as elemental nitrogen; not more than 30 w-ppm, preferably not more than 15 w-ppm, more preferably not more than 5 w-ppm, such as not more than 1 w-ppm phosphorus containing impurities, calculated as elemental phosphorus; not more than 5 w-ppm, preferably not more than 1 w-ppm silicon containing impurities, calculated as elemental silicon; optionally not more than 100 w-ppm, preferably not more than 50 w-ppm, most preferably not more than 30 w-ppm, such as not more than 10 w-ppm, such as not more than 5 w-ppm sulphur containing impurities, calculated as elemental sulphur, and optionally not more than 20 w-ppm, preferably not more than 10 w-ppm, more preferably not more than 5 w-ppm chlorine containing impurities, calculated as elemental chlorine. Depending on the efficiency of the hydrotreating catalyst bed system and the hydrotreatment reactor unit configuration even a high amount of nitrogen impurities in the feed may be tolerated, and the effluent from the HDO may contain suitably low amount of nitrogen impurities to enable subjecting it to subsequent catalytic processes.

There are several known methods to remove or decrease the amount of harmful materials, and varying purification or pre-treatment methods are commonly applied. Exemplary pre-treatment methods suitable for the present disclosure comprise treating with mineral acids, degumming, treating with hydrogen, heat treating, deodorizing, washing with water, treating with base, demetallation, distillation, removal of solids, bleaching, and any combinations thereof.

Contaminating metals may be removed from the feedstock e.g., by treatment with mineral acids. Phosphorus which mostly occurs in the form of phosphates may be removed by degumming. Triglycerides can also be pre-hydrogenated (pre-treated with hydrogen). Besides reducing the amount of oxygen containing compounds (HDO), unsaturation, sulphur, and nitrogen content (HDS, HDN) are reduced. Solid feedstocks such as fats, in turn should be liquified e.g., by heating prior to subjecting to hydrodeoxygenation. Pre-treatment of solid feedstocks may further include one or more of: grinding, agitating, filtering, and sonicating. The feedstock may further be bleached and/or deodorized.

The pre-treatment can be selected from heat treatment optionally followed by evaporation of volatiles; heat treatment with adsorbent (HTA), optionally followed by flash evaporation; degumming; bleaching. According to one embodiment the pre-treatment includes any one of, any combination of, or all of a degumming step, a chemical treating step, a water-wash step, a demetallation step, a bleaching step, a full (or partial) hydrogenation step, an acid gas removal step, and/or a water removal step. The pre-treatment also typically comprises a step of removing impurities from the feedstock, including any suitable removal of solids from a liquid, including filtration, centrifugation, and sedimentation; and removing volatiles from liquid, e.g., by evaporation. In the pre-treatment the feedstock comprising organic material of biological origin, as previously defined, is purified and a purified feedstock is obtained.

In one embodiment the pre-treatment is selected from heat treatment optionally followed by evaporation of volatiles, whereby the feedstock is heated at a temperature of from 80° C. to 325° C., preferably 180° C. to 300° C., more preferably 200° C. to 280° C., in a residence time from 1 to 300 min. The heat treatment can be followed by an evaporation step, where especially silicon and phosphorous containing compounds are removed. An example of heat treatment of a feedstock comprising organic material can be found in WO 2020/016405. Heat treatment can also be followed by filtration as an addition or an alternative to evaporation. When the feedstock comprises brown grease or acidulated soap stock the pre-treatment comprises typically heat treatment with or without a filter-aid (adsorbent) followed by filtration and possible bleaching.

In one embodiment the pre-treatment is selected from heat treatment with adsorbent (HTA) optionally followed by flash evaporation. HTA as pre-treatment is especially suitable when the feedstock comprises CTO and/or TOP, but HTA is also suitable for other feedstocks. Heat treatment with adsorbent (HTA) can be performed in a temperature from 180° C. to 325° C., preferably from 200° C. to 300° C., more preferably from 240° C. to 280° C., optionally in the presence of an acid. The adsorbent can be selected from alumina silicate, silica gel and mixtures thereof and is typically added in an amount of 0.1 wt-% to 10 wt-%, such as 0.5 wt-%. An example of HTA can be found in WO 2020/016410.

In one embodiment the pre-treatment is selected from bleaching. Bleaching can be conducted by acid addition in an amount of from 500 to 5000 ppm based on feed. The bleaching treatment can be performed in a temperature from 60° C. to 90° C. and including a drying step in 110° C. to 130° C. The bleaching is finished by a filtration step to remove formed solids and possible filter aids. In one example bleaching includes the following sequence
  (1) acid addition 1000-4000 ppm citric acid (50 wt-% water) 85° C., 10 min;
  (2) adsorbent/filter aid addition 0.1-1 wt-%, 85° C., 800 mbar, 20 min;
  (3) drying 120° C., 80 mbar, 25 min
  (4) filtering 120° C., 2.5 bar.

Both heat treatment (HT) and heat treatment with adsorbent (HTA) can be performed under pressure, the pressure can be 500 to 5000 kPa. Also, water can be added before or during HT and HTA to a level of up to 5 wt-%, such as 1 wt-%-3 wt-%. The evaporation e.g., flashing can be performed after HT or HTA or any other pre-treatment stage and can be performed at about 160° C., such as from 150° C. to 225° C., in a pressure of 10 to 100 mbar.

In one embodiment the pre-treatment comprises heat treatment (HT) and bleaching.

In one embodiment the pre-treatment comprises heat treatment (HT) with alkali addition and bleaching.

In one embodiment the pre-treatment comprises heat treatment with adsorption (HTA) followed by flash (removal of light components comprising Si components etc. by evaporation) and bleaching.

In addition, the pre-treatment may or may not include additional steps such as removal of solids (using technologies such as centrifugation or filtration) before and/or after HT or HTA, water washing, degumming, hydrolysis, distillation, strong acid treatment, 2nd bleaching or any combination of the mentioned methods.

Feedstock suitably purified by pre-treatment prolongs the catalyst life cycle in hydrodeoxygenation and subsequent reactions like isomerization or cracking.

Hydrodeoxygenation

As defined herein deoxygenation is a method for the removal of covalently bound oxygen from organic molecules. Hydrodeoxygenation refers herein to removal of oxygen as $H_2O$, $CO_2$ and/or CO from the oxygen containing hydrocarbons by hydrodeoxygenation, decarboxylation and/or decarbonylation. Whereas during catalytic cracking, there will be acid catalysed breaking down of C—C bonds of hydrocarbons or breaking down long chained hydrocarbons to form shorter hydrocarbon chains or branching or cyclisation without the need for presence of molecular hydrogen, merely under the influence of a suitable catalyst.

As defined herein hydrogenation is a method for saturation of carbon-carbon double bonds by means of molecular hydrogen under the influence of a catalyst.

The hydrotreatment comprising deoxygenation and isomerisation reactions may be conducted in a single reactor conducting hydrodeoxygenation and isomerisation reactions in same or subsequent catalyst beds, in multiple catalyst bed systems, or in separate reactors. Preferably, the deoxygenation and isomerisation reactions in the hydrotreatment are conducted in separate deoxygenation and isomerisation steps, in subsequent catalyst beds, in the same reactor or in separate reactors. Most preferably, the deoxygenation and isomerisation reactions are conducted in separate reactors.

According to the present method, the pre-treated feedstock is subjected to hydrodeoxygenation. The hydrodeoxygenation of renewable oxygen containing hydrocarbons is performed at reaction conditions comprising one or more of
  a. a temperature in the range from 250° C. to 400° C., preferably from 280° C. to 380° C., more preferably from 300° C. to 360° C.,
  b. a pressure in the range from 10 bar to 200 bar, preferably from 20 bar to 80 bar,
  c. a weight hourly space velocity (WHSV) in the range from 0.25 $h^{-1}$ to 3.0 $h^{-1}$, preferably from 0.5 to 3.0 $h^{-1}$, more preferably from 0.7 $h^{-1}$ to 2.5 $h^{-1}$, most preferably from 1.0 $h^{-1}$ to 2.0 $h^{-1}$, depending on the hydrogen consumption,
  d. a $H_2$ flow in the range from 350 to 1500 N-L $H_2$/L feed, preferably from 350 to 1100 N-L $H_2$/L feed, more preferably from 350 to 1000 N-L $H_2$/L feed, wherein N-L $H_2$/L means normal litres of hydrogen per litre of the feed into the HDO reactor, and
  e. a hydrodeoxygenation catalyst selected from Pd, Pt, Ni, Co, Mo, Ru, Rh, W, or any combination of these on a support, preferably Ni, Co, Mo, and W, or any combination thereof on a support.

According to one embodiment the hydrodeoxygenation catalyst is selected from a group consisting of CoMo, NiMo, NiW, and CoNiMo on a support, wherein the support is preferably alumina and/or silica.

According to a particular embodiment the hydrodeoxygenation reaction comprise temperature in the range from 250° C. to 400° C., pressure in the range from 20 bar to 80 bar, a WHSV in the range from 0.5 $h^{-1}$ to 3 $h^{-1}$, and $H_2$ flow of 350-1500 N-L $H_2$/L feed, and a hydrodeoxygenation catalyst.

In one embodiment, the hydrodeoxygenation of renewable oxygen containing hydrocarbons is most preferably carried out in the presence of sulphided NiMo or sulphided CoMo catalysts on a support in the presence of hydrogen gas. Using a sulphided catalyst, the sulphided state of the catalyst may be maintained during the HDO step by an addition of sulphur in the gas phase or by using a feedstock having sulphur containing mineral oil blended with the renewable oxygen containing hydrocarbons. Sulphur may be deliberately added to the feedstock being subjected to hydrodeoxygenation, for example, within a range from 50 w-ppm (ppm by weight) to 20 000 w-ppm, preferably within a range from 100 w-ppm to 1000 w-ppm, when using hydrodeoxygenation catalysts requiring a sulphided form for operation.

Effective conditions for hydrodeoxygenation may reduce the oxygen content of the HDO effluent to less than 1 wt-%, such as less than 0.5 wt-% or less than 0.2 wt-%.

In addition to oxygen removal, the hydrotreatment conditions used are to some extent able to reduce further e.g. the amount of nitrogen by hydrodenitrogenation (HDN), sulphur by hydrodesulphurization (HDS), and aromatics by hydrodearomatization (HDA) in the feed.

Purification of the Hydrodeoxygenated Stream

The effluent of the hydrodeoxygenation step, i.e. the hydrodeoxygenated stream, may be purified further before entering it into the hydroisomerization. Typically, the purification includes subjecting the effluent to a gas-liquid separation i.e. removing gases, such as carbon monoxide, carbon dioxide, water, possible hydrogen sulphide and ammonia and low boiling hydrocarbons, such as C1-C4, from the liquid hydrocarbon stream. In the gas-liquid separation, the hydrotreated effluent is separated into a gaseous stream and into a hydrotreated liquid stream, which separation may be a stripping step or be followed by a stripping step, where the hydrotreated liquid stream may be stripped with a stripping gas, such as hydrogen. This may occur in a high temperature and/or high-pressure separation step, for example, at a temperature between 300° C. and 330° C. and pressure between 40 bar and 50 bar In one embodiment the obtained purified liquid hydrocarbon stream may be separated into suitable carbon number ranges for further processing e.g. by distillation. The purification may further include removing C17 and higher hydrocarbons from the effluent stream e.g. by distillation.

The hydrodeoxygenated liquid stream used for hydroisomerization comprises preferably at least 92 wt-%, more preferably at least 95 wt-%, most preferably at least 99 wt-% paraffins of the total weight of the hydrocarbons. Typically the reminder comprises some oxygen. The effluent stream is still mainly in liquid form. The amount of n-paraffins is high, preferably more than 85 wt-%, more preferably more than 90 wt-%, e.g. such as 95 wt-%, especially when using $NiMo/Al_2O_3$ as the hydrodeoxygenation catalyst.

It is generally known that alkane and paraffin are synonyms and can be used interchangeably. Isoparaffins (i-paraffins) are branched, open chain paraffins, and normal paraffins (n-paraffins) are unbranched linear paraffins. In the context of this disclosure, the term "paraffin" refers to n-paraffins and/or isoparaffins. Similarly, the term "paraffinic" refers herein to compositions comprising n-paraffins and/or isoparaffins.

Hydroisomerization

It is known, for example from EP1741768, that zeolites such as ZSM-12, ZSM-23, SAPO-11, SAPO-41 or ferrierite, together with Pt, Pd, or Ni on an alumina or silica support may be used, together or as alternatives to each other, for isomerisation of renewable paraffins into typical monomethyl branched hydrocarbons, such as diesel fuel components.

Known challenges in zeolite-based chemistry include e.g. loss of carbon to coke formation, catalyst stability, and cracking to desired carbon range molecules. These may be overcome by a careful selection of suitable catalyst properties, feed quality and operating conditions.

According to the method of the present invention, the hydroisomerization of the purified hydrodeoxygenated stream is performed in the presence of a hydroisomerization catalyst, comprising a noble metal, a 12-membered ring zeolite with pore size below 0.7 nm, and a support.

The hydroisomerization catalyst advantageously contains a noble metal selected from the Group VIII, preferably comprising Pt and/or Pd, the most preferred noble metal being platinum. The noble metal content of the catalyst is preferably from 0.1 wt-% to 3 wt-% based on the weight of the 12-membered ring zeolite, such as the ZSM-12 zeolite.

The catalyst may further include a support. The support may be selected from alumina, silica, and alumina-silica, the preferred support comprises alumina.

The hydroisomerization catalyst comprises a 12-membered ring zeolite with pore size below 0.7 nm. The 12-membered ring zeolite is preferably ZSM-12, which is a 1-dimensional 12-membered ring, with a pore size below 0.7 nm. The advantage of a MTW framework type, as in ZSM-12, is the pore openings of about 0.55 nm×0.61 nm. The zeolite, preferably ZSM-12, of the present disclosure has advantageously an aluminium content from 0.1 wt-% to 1.5 wt-%, preferably from 0.6 wt-% to 1.3 wt-%. The BET surface area is advantageous from 200 $m^2/g$ to 380 $m^2/g$, preferably from 250 $m^2/g$ to 350 $m^2/g$, such as from 270 $m^2/g$ to 340 $m^2/g$ determined by nitrogen physisorption. The zeolite, preferably ZSM-12, may have an acidity from 180 µmol/g to 500 µmol/g, preferably from 200 µmol/g to 450 µmol/g, more preferably from 200 µmol/g to 400 µmol/g, such as from 200 µmol/g to 300 µmol/g, or even such as from 230 µmol/g to 260 µmol/g, measured with $NH_3$-TPD method, which particular method is described and discussed in detail in the applicant's former patent application WO2006070073A1, p. 10. Moreover, the ratio of the Brønsted acid sites to the Lewis acid sites may be from 1.7 to 4, such as from 2.4 to 2.7, such as about 2.55, measured by pyridine FT-IR.

In one embodiment, the hydroisomerization catalyst including the preferred ZSM-12 has a BET surface area of 270 $m^2/g$ to 340 $m^2/g$, which is clearly much higher than for example for SAPO-11 type catalysts. The Si to Al ratio is from 30 to 60, preferable from 30 to 50, such as from 35 to 45.

The volume of the micropores in the zeolite of the present disclosure, preferably ZSM-12, are from 0.10 $m^2/g$ to 0.12 $m^2/g$, whereas the area of the micropores are from 240 $m^2/g$ to 260 $m^2/g$, which are both clearly higher than for SAPO-11 type catalysts.

A particular catalyst is $Pt/ZSM-12/Al_2O_3$, preferably loaded with about 0.5 wt-% Pt. Most preferably, the catalyst $Pt/ZSM-12/Al_2O_3$ has about 0.5 wt-% Pt and comprises a ZSM-12 zeolite which has a 12-membered ring, 1-dimensional structure with a pore size below 0.7 nm of a MTW framework type having pore openings of about 5.5×6.1 Å, an aluminium content from 0.6 wt-% to 1.3 wt-%, a BET surface area from 270 $m^2/g$ to 340 $m^2/g$, an acidity from 200 µmol/g to 300 µmol/g. This type of catalyst was used for the test runs.

The hydroisomerization step is performed at a temperature from 270° C. to 310° C., preferably from 275° C. to 300° C. The processing temperature refers to the temperature at the process inlet. An exemplary temperature is 280° C. Another exemplary temperature is 295° C. Pressure is typically from 10 bar to 150 bar, preferably from 30 bar to 120 bar, most preferably from 30 bar to 70 bar. An exemplary preferable pressure is from 30 to 40 bar. The WHSV is preferably from 1 $h^{-1}$ to 10 $h^{-1}$, and $H_2$ flow is typically from 100 to 900 N-L $H_2$/L feed more preferably from 200 to 650 N-L $H_2$/L, most preferably from 200 to 400 N-L $H_2$/L feed.

In one embodiment the catalyst of the present disclosure may be pre-treated by at least one or several of the following steps: Drying, preferably at a temperature of about 125° C. for 8 h under $N_2$ or $H_2$ flow; Reducing, preferably at a temperature of about 350° C. for 2 h at a pressure of about 40 bar under $H_2$ flow; Wetting, preferably at a temperature of about 200° C. for 2 h at a pressure of about 40 bar under $H_2$ flow; Stabilizing, preferably at a temperature of about 200° C. for 2 h at a pressure of about 40 bar under $H_2$ flow.

It was surprisingly observed that when the hydroisomerization reaction was performed using a catalyst according to the present disclosure, the hydroisomerized stream obtained comprising i-paraffins exhibiting pronounced multibranching. In addition to monomethyl branching also dimethyl branches, trimethyl branches and tetramethyl branches were present contrary to the tested SAPO-11 catalyst.

The increased activity of the Pt impregnated ZSM-12 based catalyst may be related to the mitigation of internal diffusion limitations inside the micropores in a 12-membered ring system compared to 10-membered ring material. The increased activity compared to the 10-membered ring system of e.g. SAPO-11-based material allows production of jet fuel using lower reaction temperatures. Moreover, the cold flow properties of the produced jet fuel and naphtha range avgas with the 12-membered-ring catalyst turned out to be superior over the 10-membered ring reference catalyst due to increased amount of branched molecules in the product sample. A similar behaviour may further be expected with heavier HDO effluent feeds. As the branched molecules are more easily cracked, the carbon number distribution of the jet fraction may be tailored by further process and catalyst optimization.

According to a preferable embodiment the hydroisomerized stream comprises at least 95 wt-% C5-C18 i-paraffins, preferably at least 95 wt-% C5-C16 i-paraffins.

Stabilization

There may be further steps included either combined with the hydrolsomerization step, or thereafter, as separate process steps. These may comprise further purification, fractionation, or stabilisation. Typically, such additional process steps allow better control of desired properties of the effluent.

The isomerization step may comprise optional stabilisation e.g. by stripping before the effluent is exiting the reactor or there may be a separate optional stripping step after the isomerisation step, such as an additional stripping column.

Separation of the Aviation Fuel Fractions

The hydroisomerized stream, optionally stabilised hydroisomerized effluent from the hydroisomerization, is subjected to separation using conventional separation processes, such as fractionation through distillation at atmospheric pressure and/or at reduced pressure. The fractionation is used to separate the hydroisomerized stream at least into a fraction suitable for use as renewable aviation fuel, or components thereto.

In the present disclosure renewable aviation fuel or components thereto, preferably comprising C5-C16 hydrocarbons, such as branched C5-C16 hydrocarbons are separated from the hydroisomerized stream, or from the stabilized hydroisomerized stream.

According to another embodiment, the separation is used to separate the hydroisomerized stream, or the stabilized hydroisomerized stream into a fraction comprising renewable C1-C4 hydrocarbons.

In the present disclosure aviation fuel or components thereto, preferably comprising C5-C16 hydrocarbons, such as branched C5-C16 hydrocarbons are separated from the hydroisomerized stream, or the stabilized hydroisomerized stream.

According to one embodiment, the separation is used to separate the hydroisomerized stream, or the stabilized hydroisomerized stream, into
  (i) A fraction comprising renewable C10-C16 hydrocarbons, such as branched C10-C16 hydrocarbons, which are suitable for use in aviation fuel applications, such as jet fuel or components thereto. The separated hydrocarbon fraction has preferably an initial boiling point at atmospheric pressure of at least 150° C. and a final boiling point of up to 290° C.
  (ii) A fraction comprising renewable C5-C9 hydrocarbons, such as branched C5-C9 hydrocarbons, which are naphtha range hydrocarbons, suitable for use in selected aviation fuel applications, such as aviation gasoline or components thereto or as renewable naphtha or components thereto. The separated hydrocarbon fraction has preferably an initial boiling point at atmospheric pressure of at least 60° C. and a final boiling point of up to 150° C.

Preferably, the hydroisomerized stream, or the stabilized hydroisomerized stream, is further separated into a further fraction (iii) comprising renewable C1-C4 hydrocarbons, which are the gas range hydrocarbons. More preferably, C3-C4 hydrocarbons are further separated from the C1-C4 hydrocarbons, and subsequently C3 hydrocarbons may be separated from the C3-C4s, and e.g. propane may be recovered therefrom.

In one embodiment, the separation is made to
  A fraction comprising renewable C1-C2 hydrocarbons.
  A fraction comprising renewable C3-C4 hydrocarbons, a.k.a. a fraction suitable for recovery of renewable propane and renewable butane.
  A fraction comprising renewable C5-C9 hydrocarbons, such as branched C5-C9 hydrocarbons a.k.a. a fraction suitable for use as renewable aviation fuel, namely aviation gasoline or components thereto, or suitable for use as naphtha or components thereto.
  A fraction comprising renewable C10-C16 hydrocarbons, such as branched C10-C16 hydrocarbons, a.k.a. a fraction suitable for use as sustainable aviation fuel, namely jet fuel, or components thereof.

The renewable avgas obtained by the present disclosure, such as sustainable avgas, may be suitable for use as avgas or components thereto fulfilling the properties required by the Defence Standard 91-090 (2019).

According to one embodiment, the obtained renewable aviation fuel comprises at least 40 wt-%, preferably at least 60 wt-%, by weight paraffins comprising at least two branched methyl groups.

In one embodiment the obtained branched hydrocarbons, in the renewable aviation fuel component range, comprised paraffins with branched dimethyl groups, branched trimethyl groups and branched tetramethyl groups. Preferably, the amount of branched dimethyl groups in the branched hydrocarbons is at least 2 times the amount of the branched trimethyl or higher branched methyl groups of the branched hydrocarbons. Branched dimethyl groups in the branched hydrocarbon provide better cold properties compared to branched monomethyl groups, and they have a minor tendency to crack into lighter products compared to branched trimethyl or higher branched methyl groups.

The possible remainder of hydrocarbons higher than C16 may be recovered and used for e.g. diesel fuel production.

The present disclosure provides also a new use of a catalyst comprising a noble metal, a 12-membered ring zeolite, preferably ZSM-12, with a pore size below 0.7 nm, on a support for producing renewable aviation fuel from a renewable paraffinic feed by hydroisomerization at a temperature in a range from 270° C. to 310° C., in presence of a hydrogen flow. The noble metal comprises a metal of Group VIII, preferably selected from palladium and/or platinum, more preferably platinum. The BET surface area of the catalyst is preferably above 300 m$^2$/g.

EXPERIMENTAL

Example 1

The characterization of the used ZSM-12 zeolite and the comparative SAPO-11 are presented in Table 1. The highest BET surface area was measured for the ZSM-12 catalyst (325 m$^2$g$^{-1}$), which was significantly higher compared to the reference material.

TABLE 1

Morphological properties of zeolites.

| Zeolite | Si/Al | BET/ m$^2$g$^{-1}$ | Micropore vol cm$^3$g$^{-1}$ | Micropore area m$^2$g$^{-1}$ | Maximum diameter of a sphere that can enter/Å |
|---|---|---|---|---|---|
| ZSM-12 | 38 | 325 | 0.114 | 248 | 6.08 |
| Reference SAPO-11 | | 171 | 0.0421 | 103 | 5.64 |

Both, ZSM-12 and SAPO-11, were impregnated with about 0.5 wt-% Pt and tested without passivation and a support, for the aim of comparing the performance of ZMS-12 and SAPO-11.

The support was not considered to have a major effect on the obtained comparative results, the selectivity and yield behaviour are mostly governed by the zeolite. Passivation is anticipated to enhance the performance of both catalysts, e.g. in terms of selectivity, but it was not considered to essentially affect the comparative results. The equipment used consisted of 16 individual stainless steel fixed-bed reactors, which could be run in parallel, n-Hexadecane was used as the HDO effluent feed for the hydroisomerization experiments. The first reaction temperature was 280° C. after which temperature was increased to 310° C. in all the reactors. Subsequently, the temperature was decreased to 295° C. for Pt/ZSM-12 (meaning the Pt impregnated ZSM-12 catalyst) but increased to 340° C. in the case of Pt/SAPO-11 (meaning the Pt impregnated SAPO-11 catalyst) reference catalyst. The used process parameters are summarized below:

Drying: 125° C., 8 h, $N_2$ flow
Reduction: 350° C., 2 h, 40 bar, $H_2$ flow
Wetting: 200° C., 2 h, 40 bar, $H_2$ flow
Stabilization: 200° C., 2 h, 40 bar, $H_2$ flow.
Reaction conditions: 280-340° C., 40 bar, WHSV 1.3 $h^{-1}$, $H_2$/oil ratio 300 N-L/L (for gaseous hexadecane), 40 mg catalyst (50-100 μm)

The analysis of the gaseous products was made with an online GC (Agilent 7890) equipped with three detectors (2 TCD and 1 FID). The quantified gases were $N_2$, He, $CO_2$, CO, $O_2$ and hydrocarbons between C1-C12. The analysis of the liquid products was made with an offline GC (QP2010 Ultra El, Shimadzu) having an FID and mass spectrometer and the quality thereof was assessed by using GC*GC analysis. The liquid products consisted of all the produced C13-C16 hydrocarbons and the produced C5-C12 hydrocarbons were collected as liquid and gas products.

The GC*GC analysis results (Table 2) confirm that the degree of branching is significantly increased when using a catalyst comprising ZSM-12 compared to SAPO-11. The highest amount of branched dimethyl-C16 was obtained with the ZSM-12 containing catalyst, which was about 50% higher compared to the SAPO-11 containing catalyst. The levels of branched trimethyl-C16 and branched tetramethyl-C16 were also much higher in the ZSM-12 containing catalyst than for the SAPO-11 containing catalyst. The ZSM-12 containing catalyst also produced a higher total amount of i-paraffins throughout the carbon number distribution from C5 to C16 compared to the reference catalyst. The isomerization degree of C16 hydrocarbons at 280° C. and 310° C. with Pt/ZSM-12 and Pt/SAPO-11 catalysts, respectively is depicted in table 2.

The conversion results by the tested catalysts, the 12-membered-ring catalyst Pt/ZSM-12 and the 10-membered-ring Pt/SAPO-11 reference catalyst at different temperatures are presented in Table 3. The ZSM-12 based catalyst was active already at 280° C. with conversions close to 100%, and the SAPO-11 based catalyst appears significantly less active at 280° C. and reaches full conversion at higher temperatures, only after 340° C. Thus, Pt/ZSM-12 requires an at least 60° C. lower reaction temperature to reach full conversion. Typically, the optimal operating temperature is selected for the catalyst based on the most suitable range of conversion, selectivity, and yield. Operating outside the optimal range merely generates unwanted side or by-products.

TABLE 3

| Catalyst | T = 280° C. | T = 295° C. | T = 310° C. | T = 340° C. |
|---|---|---|---|---|
| Ref. SAPO-11 | 31.0 | NA | 93.1 | 99.2 |
| ZSM-12 | 98.2 | 100 | 100 | NA |

Example 2

The products obtained from example 1 included hydrocarbons falling within the following categories:
C1-C4 hydrocarbons, which are the gas range hydrocarbons, preferably wherefrom e.g. C3: s like propane may be recovered.
C5-C9 hydrocarbons, which are naphtha range hydrocarbons, suitable for use in selected aviation fuel applications, such as avgas or components thereto.
C10-C16 hydrocarbons, which are suitable for use in aviation fuel applications, such as jet fuel components.

Table 4 shows the product yields obtained by hydroisomerization at 280° C. with ZSM-12 and SAPO-11 based catalysts. At 280° C., the highest aviation fuel range yield, 68.5 wt % (C10-C16) and 17.1 wt % (C5-C9) were obtained using the ZSM-12 catalyst. SAPO-11 based catalyst was clearly less active at this temperature and produced clearly lower aviation fuel range yields than the ZSM-12 based catalyst.

TABLE 4

| Catalyst at 280 ° C. | C1-C4 | C5-C9 | C10-C16 |
|---|---|---|---|
| Reference Pt/SAPO-11 | 0.2 | 1.2 | 23.4 |
| Pt/ZSM-12 | 3.3 | 17.1 | 68.5 |

Table 5 shows the product selectivities at 280° C. for hydroisomerization with the ZSM-12 and SAPO-11 based catalysts. The selectivity is clearly better for the ZSM-based catalyst towards the lower carbon numbers. This tendency

TABLE 2

| Catalyst | t/° C. | n-C16/ wt. % | me-C16/ wt. % | dime-C16/ wt. % | trime-C16/ wt. % | tetrame-C16/ wt. % | total i-paraffins in liquid/ wt. % | C4+ yield/ mol. %* |
|---|---|---|---|---|---|---|---|---|
| Pt/ZSM-12 | 280 | 2.8 | 23.1 | 47.4 | 21.9 | 1.9 | 96.3 | 93.9 |
| Reference Pt/SAPO-11 | 310 | 7.4 | 65.8 | 23.3 | 1.5 | 0.0 | 91.7 | 79.6 |

*Combination of liquid and gas phase GC analysis.

becomes more pronounced when increasing the hydroisomerization temperature further.

TABLE 5

| Catalyst | C1-C4 | C5-C9 | C10-C16 |
| --- | --- | --- | --- |
| Reference Pt/SAPO-11 | 0.4 | 14.7 | 94.8 |
| Pt/ZSM-12 | 3.7 | 19.2 | 77.2 |

Although aviation fuel range hydrocarbon blends can be produced using SAPO-11 based catalyst, the cloud point of the aviation fuel was significantly lowered when using the ZMS-12 based catalyst as the hydroisomerization catalyst, as depicted by table 6. The improvement of the cloud point is related to higher branching of hydrocarbons and the shift of hydrocarbon distribution to lower carbon number products.

TABLE 6

| Catalyst | Hydroisomerization temperature | Cloud point |
| --- | --- | --- |
| Reference Pt/SAPO-11 | 310° C. | −21.7° C. |
| Pt/ZSM-12 | 280° C. | −35.5° C. |

The specific examples provided in the description given above should not be construed as limiting the scope and/or the applicability of the appended claims. Lists and groups of examples provided in the description given above are not exhaustive unless otherwise explicitly stated.

The invention claimed is:

1. A method for producing renewable aviation fuel or components thereto, the method comprising the following steps:
   a) providing a renewable feedstock,
   b) pre-treating the renewable feedstock by reducing the amount of impurities therein not to include: more than 10 w-ppm alkali metal and alkaline earth metal impurities, calculated as elemental alkaline and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon wherein the pre-treating is selected from treating with mineral acids, degumming, treating with hydrogen, liquefying, heat treating, deodorizing, and bleaching; to produce a pre-treated feedstock,
   c) subjecting the pre-treated feedstock to hydrodeoxygenation reaction conditions to produce a hydrodeoxygenated stream, wherein the hydrodeoxygenation reaction conditions comprise one or more of:
   a. a temperature in the range from 250° C. to 400° C.,
   b. a pressure in the range from 10 bar to 200 bar,
   c. a WHSV in the range from 0.25 $h^{-1}$ to 3 $h^{-1}$,
   d. a $H_2$ flow of 350 to 1500 N-L $H_2$/L feed, and
   e. a hydrodeoxygenation catalyst selected from Pd, Pt, Ni, Co, Mo, Ru, Rh, and W or any combination thereof, on a support
   to produce hydrodeoxygenated stream,
   d) subjecting the hydrodeoxygenated stream to a gas-liquid separation thereby producing a gaseous stream and a hydrodeoxygenated liquid stream,
   e) subjecting the hydrodeoxygenated liquid stream to hydroisomerization reaction in a presence of a hydroisomerisation catalyst, comprising a noble metal, a 12-member ring ZSM-12 zeolite with pore size below 0.7 nm acidity from 180 μmol/g to 500 μmol/g measured with $NH_3$-TPD method, aluminum content from 0.1 wt.-% to 1.5 wt.-%, Si to Al ratio from 30 to 60, and the ratio of Bronsted acid sites to the Lewis acid sites from 1.7 to 4, on a support, and hydrogen in a pressure in the range from 30 bar to 40 bar, at a temperature in a range from 270° C. to 310° C. to produce a hydroisomerized stream,
   f) optionally subjecting the hydroisomerized stream to stabilization, to produce a stabilized hydroisomerized stream, and
   g) separating from the hydroisomerized stream, or the stabilized hydroisomerized stream, the renewable aviation fuel, or components thereto, wherein the renewable aviation fuel or components thereto comprises renewable C5-C9 hydrocarbons suitable for aviation gasoline or components thereto, and renewable C10-C16 hydrocarbons suitable for jet fuel or components thereto.

2. The method according to claim 1, wherein the step e) further comprises separating from the hydroisomerized stream or from the stabilized hydroisomerized stream a fraction rich in renewable C1-C4 hydrocarbons.

3. The method according to claim 1 wherein in step c) temperature is from 260° C. to 380° C., pressure is from 20 bar to 100 bar, a weight hourly space velocity (WHSV) is in the range from 0.5 $h^{-1}$ to 3.0 $h^{-1}$ and $H_2$ flow is in the range from 350 to 1100 N-L $H_2$/L feed.

4. The method according to claim 1, wherein the renewable feedstock is sustainable feedstock selected from feedstocks listed in Annex IX, Part A or Annex IX, Part B of the Renewable Energy Directive (EU) 2018/2001 and mixtures thereof.

5. The method according to claim 1, wherein the feedstock is selected from waste and residues of animal fat or oil, plant fat or oil, and fish fat or oil, and mixtures thereof.

6. The method according to claim 1, wherein the feedstock comprises triglycerides and/or free fatty acids.

7. The method according to claim 1, wherein the noble metal comprises platinum.

8. The method according to claim 1, wherein the content of the noble metal of the hydroisomerization catalyst is from 0.1 wt-% to 3.0 wt-% based on the weight of the 12-member ring zeolite.

9. The method according to claim 1, wherein the support is selected from alumina, silica, and silica-alumina.

10. The method according to claim 1, wherein BET surface area of the hydroisomerization catalyst is 200-380 $m^2$/g determined by nitrogen physisorption.

11. The method according to claim 1, wherein the hydroisomerization reaction comprise a temperature in the range from 275° C. to 300° C.

12. The method according to claim 1, wherein the hydroisomerized stream comprises at least 95 wt-% C5-C28 i-paraffins.

13. The method according to claim 1, wherein the renewable aviation fuel comprises at least 40 wt-% i-paraffins comprising at least two i-methyl groups.

14. The method according to claim 1, wherein WHSV of the hydroisomerization reaction of step e) is from 1 $h^{-1}$ to 10 $h^{-1}$.

15. The method according to claim 1, wherein in step c), at least one of: temperature is from 280° C. to 360° C., pressure is from 20 bar to 80 bar, WHSV is in the range from 0.7 $h^{-1}$ to 2.5 $h^{-1}$, and $H_2$ flow is in the range from 350 to 1000 N-L $H_2$/L feed.

16. The method according to claim 1, wherein the feedstock is selected from palm oil residues and wastes, tall oil material, used cooking oil, acid oils, brown grease, spent bleaching earth oil, technical corn oil.

17. The method according to claim 1, wherein the support is alumina.

* * * * *